Bond & Lee,
Grooving Sheet Metal.

Nº 83,128.    Patented Oct. 20, 1868.

Witnesses:
B. McChesney.
B. Chase.

Inventors
Wm. H. Bond.
Geo. G. Lee
per F. A. Morely
Atty.

WILLIAM H. BOND AND GEORGE G. LEE, OF SYRACUSE, NEW YORK.

*Letters Patent No. 83,128, dated October 20, 1868.*

IMPROVEMENT IN GROOVING-MACHINES.

The Schedule referred to in these Letters Patent and making part of the same.

*To all whom it may concern:*

Be it known that we, WILLIAM H. BOND and GEORGE G. LEE, of Syracuse, in the county of Onondaga, and State of New York, have invented a new and useful Improvement in Grooving-Machine; and we do hereby declare that the following is a full, clear, and exact description thereof, which will enable those skilled in the art to make and use the same, reference being had to the accompanying drawings, forming part of this specification, in which—

Figure 1:
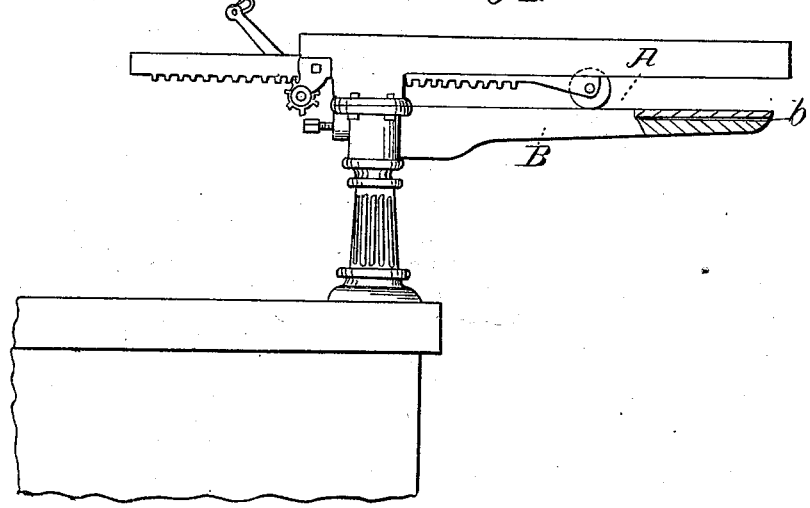

Figure 1 is a side view of a grooving-machine having our improvement.

Figure 2:
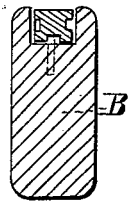
Figure 3:
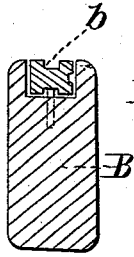
Figure 4:
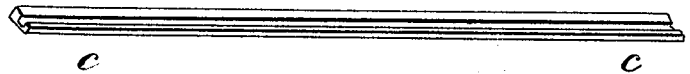

Figures 2, 3, and 4, are detail views.

Similar letters of reference indicate like parts.

This invention relates to certain improvements in tinners' grooving-machines, whereby the machine is readily converted from a machine which folds the seams down on the outside of the tin vessel or pipe, &c., to one for folding the seams down on the inside of said vessels, pipe, &c., and thereby making a single machine adaptable for work which has heretofore required two machines, or a separate machine for each method of turning down the seams, as hereinafter more fully described.

Fig. 1, in the accompanying drawings, shows an ordinary grooving-machine with our improvement attached. In place of using an arm, B, having a plain rolling-face, with a grooved roller, A, for turning the seam on the outside, and a second machine, having a grooved arm, B, with a plain-faced roller, A, for turning seams on the inside, we channel out the face of the arm B, so as to receive and hold a square bar $b$, which has grooves of different sizes on three of its faces, and one plain face, as shown by cross-sections, figs. 2 and 3; or the bar $b$ may be made with a single groove, as shown in fig. 4.

When this bar $b$ is adjusted in the channel of the arm B, with its plain face upward, then a grooved roller, A, is also adjusted to the machine, and it is ready for outside seaming; and when inside seaming is to be done, the bar $b$ is turned over, to present a grooved rolling-face, and a plain-faced treading-roller, A, is substituted in place of the grooved one, and by this means the machine is made adaptable for folding the seams of work on either the inside or outside, as desired, and but a single machine is required to do work that has heretofore required two machines.

Having thus described our invention,

What we claim as new, and desire to secure by Letters Patent, is—

An arm, B, when constructed in such manner as to alternately present a plain or grooved rolling-face, as desired, substantially as and for the purpose herein described.

The above specification of our invention signed by us, this 27th day of March, 1868.

WM. H. BOND.
GEO. G. LEE.

Witnesses:
B. CHASE,
F. A. MORLEY.